June 23, 1931.  J. WOLTER  1,811,165
DUST BIN
Filed May 28, 1930

Inventor:
Jonny Wolter.

Patented June 23, 1931

1,811,165

UNITED STATES PATENT OFFICE

JONNY WOLTER, OF HAMBURG, GERMANY

DUSTBIN

Application filed May 28, 1930, Serial No. 456,772, and in Germany November 8, 1928.

The object of the present invention is to produce a dust-bin which will receive and discharge its contents, such as ashes and the like, without raising any outside dust, and the invention consists in the provision of a closed receptacle having in one of its walls a rotatable plate carrying a frame wherein a slide is guided so as to allow being extended through an aperture in the plate for the reception of an ash pan, means being provided for securing the pan to the slide so that it can be turned over and emptied by means of the plate inside the closed bin. The bottom of the receptacle is composed of loose segmental plates which are suspended from pivots by means of frames which are controlled by plungers and pivoted flaps so as to open out under the weight of the bin when the latter is supported by means of the flaps on the edge of an opening in a collector.

Figure 1:
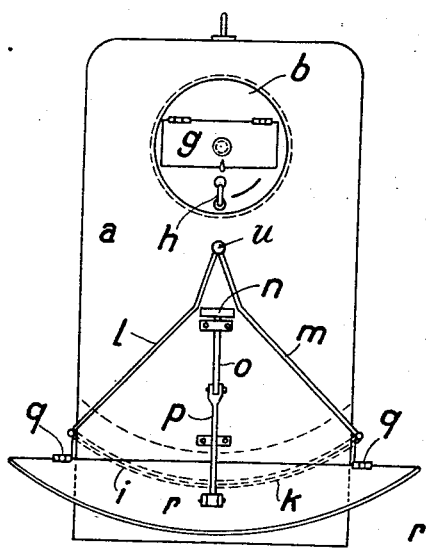

Fig. 1 of the accompanying drawings represents a front view of the improved dust-bin showing its normal appearance.

Figure 2:
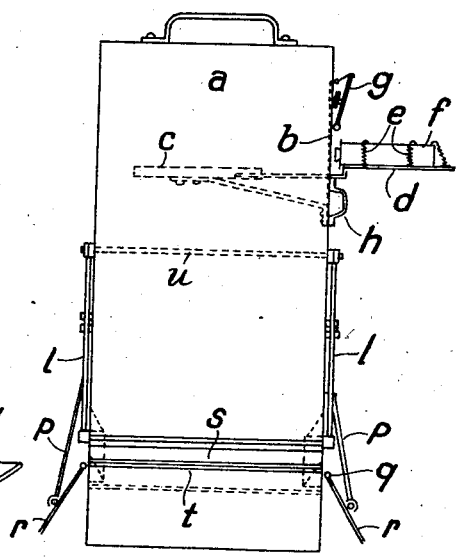
Figure 3:
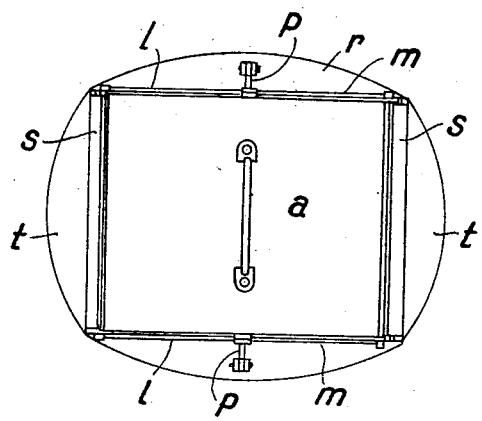

Fig. 2 is a side view of the same showing the slide extended for the reception of an ash pan, and Fig. 3 is a top view of the bin.

The dust-bin comprises a closed rectangular receptacle $a$ provided with a bottom in the form of segmental plates $i$ and $k$ which enter the receptacle through slits in opposite walls and which are suspended by means of frames $l$ and $m$ from shaft $u$ so that they can be moved about the shaft and thus separated for the discharge of the contents of the receptacle. The upper portions of the frames $l$ and $m$ are maintained normally at an acute angle relative to each other for co-operation with the head $n$ of a plunger $o$. When the latter receives an upward thrust, the head $n$ engages between the frame members and turns the latter so as to separate the bottom plates. The two plungers $o$ are connected by means of links $p$ to flaps $r$ which are movable about hinges $q$ and which are normally maintained in a downwardly inclined position as indicated in Fig. 2.

For admitting the dust to the receptacle an aperture is made in the plate $b$ which is rotatably supported in the upper portion of one of the walls of the receptacle. This plate carries within the receptacle a frame $c$ wherein a slide $d$ is guided so that it can be extended through the aperture as shown in Fig. 2. The slide is fitted with spring catches $e$ whereby an ash pan $f$ may be connected to it and then inserted together with the slide into the dust-bin. After such insertion, the inlet aperture is closed by means of a hinged lid $g$ whereupon the plate $b$ is rotated by means of a handle $h$ so as to turn the ash pan into an inverted position for emptying it of its contents. Since the dust-bin is closed, this will be effected without raising any dust outside it.

The dust-bin itself is emptied into a collector having an aperture into which the lower end of the dust-bin can be inserted while the flaps are allowed to abut against the collector. The flaps will be deflected under the weight of the dust-bin, and the bottom plate $i$ and $k$ will thus be opened out for discharging the contents of the bin into the collector. Since the aperture is covered by the dust-bin, the emptying of the latter can also be effected without raising any outside dust.

Angle-irons $s$ on the sides of the receptacle not fitted with flaps, carry rigid plates $t$ which, together with the flaps, form a flange all round the receptacle when the latter rests on the collector.

When the receptacle is removed from the collector, the bottom plates return by gravity to their normal positions.

I claim:

1. A dust-bin comprising a closed receptacle, a plate supported rotatably in one of the walls of said receptacle, said plate having an aperture forming the inlet for the receptacle, a frame secured to said plate inside the receptacle, a slide guided in said frame and adapted to be extended from the receptacle through said aperture, means for securing an ash pan to said slide so that it can be inserted together with the latter into the receptacle and so that it will be retained thereon when the frame is turned over by means of the plate inside the receptacle, and a hinged lid for closing said aperture.

2. A dust-bin as claimed in claim 1 provided with a bottom in the form of segmental plates which enter through slits in opposite walls, frames whereby said bottom plates are suspended from pivots on the receptacle walls so that they can be separated for discharging the contents of the receptacle, slidable plungers engaging said frames and adapted, on receiving an upward thrust, to turn them so as to separate the plates, flaps connected pivotally to the receptacle, and links connecting the flaps with said pivoted frames, said flaps operated to apply upward thrust to the plungers under the weight of the receptacle when made to support the latter.

JONNY WOLTER.